United States Patent
Hosnédl et al.

[11] 3,734,583
[45] May 22, 1973

[54] SPINDLE ADAPTED FOR TEXTILE MACHINERY

[75] Inventors: Václav Hosnédl; Zdeněk Rajsigl; Jiří Rathuský; Miroslav Prokopec, all of Brno; Miloš Mládek, Usti nad Orlici, all of Czechoslovakia

[73] Assignee: Zvl Vyzkumny ustav pro Valiva loziska, Brno, Czechoslovakia

[22] Filed: Jan. 7, 1972

[21] Appl. No.: 216,020

[52] U.S. Cl. ............................................. 308/189 R
[51] Int. Cl. ............................................. F16c 35/04
[58] Field of Search .......................... 308/189, 207

[56] References Cited
UNITED STATES PATENTS 1,700,837  2/1929  Fisher ............................... 308/189 R

*Primary Examiner*—Charles J. Myhre
*Assistant Examiner*—Frank Susko
*Attorney*—Arthur O. Klein

[57] ABSTRACT

A spindle, particularly adapted for use in textile machinery, with a spindle bushing containing a shaft mounted in a pair of bearings disposed in a holder. On the circumference or at least on a part of the circumference of the spindle bushing there is located a groove in which a split circular or segmental elastic adjusting element is mounted, the adjusting element being held down from above by a thrust screw screwed into the spindle bushing holder.

6 Claims, 3 Drawing Figures

SPINDLE ADAPTED FOR TEXTILE MACHINERY

This invention relates to a high-speed spindle applicable particularly in textile machinery.

In its working position the textile spindle, which rotates in a bushing, is locked in a fixed axial position; it is necessary to prevent the bushing from rotary motion or from motion in a radial direction. In order to provide for repeated dismantling of the spindle during its whole service life, particularly during cleaning of the working elements, in the prior art a push fit for the spindle within the textile machinery has been selected, turning of the spindle being prevented by the pressure of a simple thrust screw engaging the spindle body from without. The correct function of the spindle as well as its guaranteed service life has been reduced by said method of its positioning in an uncontrollable mode resulting from deformation of the bushing caused by the pressure of said thrust screw. In addition to reduced service life, the noise of the assembly increases; this contributes to much worse working conditions, especially within textile machinery with a great number of stations having spindles.

According to the present invention, the serious abovementioned drawbacks are eliminated. There is provided a spindle, particularly for textile machinery, with a spindle bushing containing a shaft mounted in a pair of bearings. On the circumference or at least on part of the circumference of the spindle bushing there is located a groove in which there is mounted a split circular or segmental elastic adjusting element, such element being held down from above by a thrust screw screwed into the holder of the spindle bushing. The side walls of the mounted adjusting element are provided with recesses alternating with opposite projections, or the adjusting element is similarly adapted for the clearance elimination in the groove. The inner or rest face of the thrust screw is provided with a sharp point. In the circumference of the spindle bushing, or alternatively, in the bore of the holder of this bushing, there is provided a second groove in which an elastic ring is mounted.

Several examples of the spindle application according to the invention are shown on the attached drawings.

Figure 1A:
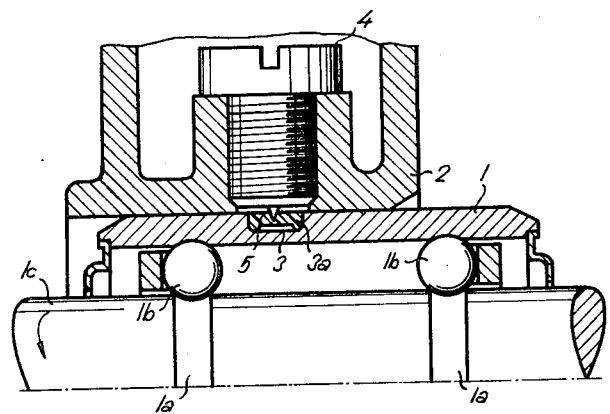
FIG. 1a is a fragmentary radial section of the spindle in front view, the view showing the mounted adjusting element.

The first illustrative embodiment of the spindle, as shown in FIG. 1a, includes a spindle bushing 1 with race-ways 1a for a ball bearing assembly 1b, wherein a shaft 1c is mounted. The spindle bushing 1, mounted for axial adjustment in the bore of a holder 2, is provided with a suitably shaped circumferential groove 3 in which an elastic adjusting element 3a is located, such element usually being a split ring made of plastic or any other resilient material. The mounting of the spindle bushing 1 within the holder is secured by a thrust screw 4 provided on its inner end with a sharp point 5. By tightening the thrust screw 4, the point 5 will penetrate with minimum radial force into the adjusting element 3a, thus retaining it in a desired adjusted position along the axis of spindle shaft 1c. The radially acting force will not cause any deformation of the raceways 1a within the spindle bushing 1. The groove 3 which can have either a flat, concave or otherwise shaped bottom, runs along the whole circumference of the bushing 1 or along a part thereof.

Figure 1B:
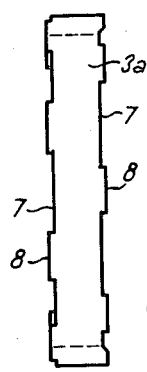
FIG. 1b is a detail view in elevation of a part of this adjusting element.

The adjusting element 3a, shown in detail in FIG. 1b, is split or otherwise adapted for mounting in groove 3. For the reason of elimination of axial clearance, element 3a is suitably shaped and made of a reasonably resilient material. The side walls of the adjusting element 3a, as indicated on the detail in FIG. 1b, are provided with recesses 7 alternating with opposite projections 8, permitting an elastic deflection of the element and thus the elimination of axial clearance of the adjusting element 3a in groove 3 of the bushing 1.

Figure 2:
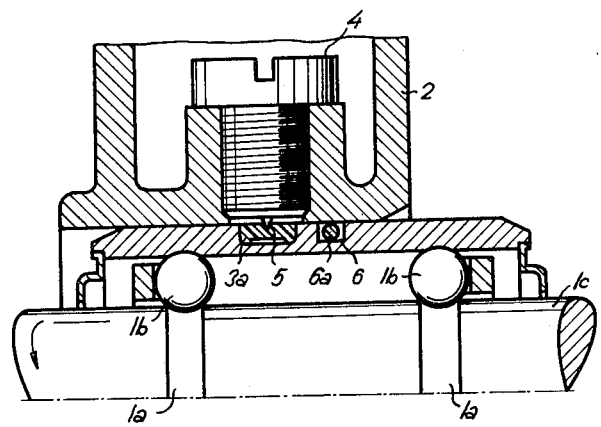
FIG. 2 is a view similar to FIG. 1 of a spindle provided with a second groove for the elastic ring.

The spindle in FIG. 2 is designed in the same way as the one described above and has the parts thereof designated by the same reference characters. It is, however, provided with a ring 6a made of a resilient material, which is located in a second groove 6 in holder 2 adjoining groove 3 for the adjusting element 3a. This elastic ring 6a is compressively engaged by holder 2 and secures the spindle within the holder against rotary motion and vibrations. At the same time, it facilitates the correct adjustment of the spindle during its assembly by frictionally retarding axial adjustment of the bushing relative to the holder.

The invention is illustrated and described with a reference to a plurality of preferred embodiments thereof and it is to be understood that it is in no way limited to said plurality of embodiments but is capable of numerous modifications according to the appended claims.

What is claimed is:

1. A spindle adapted for use in textile machinery, comprising a holder, a spindle bushing mounted in a bore in the holder and adjustable axially thereof, a shaft mounted in a bearing in the bushing, a circumferential external groove on at least part of the spindle bushing, an elongated elastic adjusting element mounted in said groove, and a thrust screw screwed into the holder of the spindle bushing and having its inner end compressively engaging the elastic adjusting element.

2. A spindle according to claim 1, wherein the side walls of the mounted adjusting element compressively engage the opposite side walls of the groove.

3. A spindle according to claim 1, wherein the groove extends completely around the bushing, and the elastic adjusting element is in the form of a split circle.

4. A spindle according to claim 1, wherein the side walls of the mounted adjusting element are provided with recesses alternating with opposite projections, said projections compressively engaging the opposite side walls of the groove.

5. A spindle according to claim 1, wherein the inner face of the thrust screw is provided with a sharp point which digs into the elastic adjusting element.

6. A spindle according to claim 1, wherein there is a second groove on the circumference of the spindle bushing or in the bore of the holder of the bushing, a second elastic ring being mounted in said second groove and compressively engaging the part which it confronts and frictionally retarding axial adjustment of the bushing relative to the holder.

* * * * *